(12) United States Patent
Wang et al.

(10) Patent No.: US 12,440,353 B2
(45) Date of Patent: Oct. 14, 2025

(54) BREAST PROSTHESIS PROCESSING SYSTEM

(71) Applicant: Shaanxi Maxwell Medical Technology Co., Ltd., Shaanxi (CN)

(72) Inventors: Jing Wang, Shaanxi (CN); Yifan Hu, Shaanxi (CN); Leru Liu, Shaanxi (CN)

(73) Assignee: Shaanxi Maxwell Medical Technology Co., Ltd., Xi'an (CN)

( * ) Notice: Subject to any disclaimer, the term of this patent is extended or adjusted under 35 U.S.C. 154(b) by 0 days.

(21) Appl. No.: 19/086,081

(22) Filed: Mar. 20, 2025

(65) Prior Publication Data

US 2025/0213374 A1    Jul. 3, 2025

Related U.S. Application Data

(63) Continuation of application No. PCT/CN2023/120075, filed on Sep. 20, 2023.

(30) Foreign Application Priority Data

Sep. 21, 2022 (CN) .......................... 202211148523.1

(51) Int. Cl.
*A61F 2/50* (2006.01)
*A61F 2/52* (2006.01)

(52) U.S. Cl.
CPC .............. *A61F 2/5046* (2013.01); *A61F 2/52* (2013.01); *A61F 2002/505* (2013.01)

(58) Field of Classification Search
CPC ..... A61F 2/5046; A61F 2/52; A61F 2002/505
See application file for complete search history.

(56) References Cited

U.S. PATENT DOCUMENTS

2003/0208269 A1* 11/2003 Eaton ........................ A61F 2/52
   623/7
2020/0147875 A1* 5/2020 Asgeirsson ........... B29C 64/241

FOREIGN PATENT DOCUMENTS

| CN | 112078253 A | 12/2020 |
| CN | 112912032 A | 6/2021 |
| WO | WO-9925536 A1 * | 5/1999 ............ A61F 2/5046 |

* cited by examiner

*Primary Examiner* — Charles R Kasenge

(57) ABSTRACT

This application example provides a breast prosthesis processing system, which includes a scanner, a data processing device, a prosthesis processing device, and a printing device. The scanner is used to scan the human body, obtain torso scan data containing images of a normal breast and the residual part after mastectomy, and send it to the data processing device. The data processing device, in response to input, marks feature points on the residual part image, mirrors them, and generates mirrored feature points. The prosthesis processing device then processes the prosthesis based on the mirrored feature points, and the printing device prints the processed prosthesis. This system aims to improve the accuracy and efficiency of breast prosthesis production, ensuring a better fit and aesthetic outcome for users. The integration of scanning, data processing, and printing technologies streamlines the entire process, providing a more personalized and precise solution for breast prosthesis manufacturing.

9 Claims, 5 Drawing Sheets

BREAST PROSTHESIS PROCESSING SYSTEM

CROSS-REFERENCE TO RELATED APPLICATIONS

This application is a continuation of PCT/CN2023/120075, filed on Sep. 20, 2023 and claims priority of Chinese Patent Application No. 202211148523.1, filed on Sep. 21, 2022, the entire contents of which are incorporated herein by reference.

TECHNICAL FIELD

This application relates to the technical field of breast prosthesis processing systems, and more specifically, to a breast prosthesis processing system.

BACKGROUND

In daily life, when female patients suffer from severe breast-related diseases, a mastectomy may be required to remove one breast. After the removal of a breast, the patient's body shape may be significantly affected, and psychological trauma may occur. Therefore, after a mastectomy, it is common to install a breast prosthesis to address these issues. However, in related technologies, it is often difficult to process breast prostheses.

SUMMARY

The embodiments of this application provide a breast prosthesis processing system to solve the problem of difficulty in processing breast prostheses in related technologies.

To address the above technical problem, the application is implemented as follows:

The embodiments of this application provide a breast prosthesis processing system, comprising a scanner, a data processing device, a breast prosthesis processing device, and a painting device;

The scanner is electrically connected to the data processing device, and the data processing device is electrically connected to the breast prosthesis processing device and the painting device;

The scanner is configured to scan a human body to obtain a human body scan image and transmit the human body scan image to the data processing device, wherein the human body scan image includes a scan image of the torso, and the torso scan image includes an image of a normal breast and an image of a residual part after the breast has been removed;

The data processing device is configured to, in response to a first input, mark feature points on the image of the residual part after the breast has been removed; mirror the feature points to obtain mirrored feature points; generate model data of the removed breast based on the mirrored feature points and the image of the normal breast, and transmit the model data of the removed breast to the breast prosthesis processing device and the painting device;

The breast prosthesis processing device includes a processor, a first driving component, and a container, wherein the processor is electrically connected to the data processing device, the processor is electrically connected to the first driving component, and the processor is configured to control the first driving component based on the model data to drive the container to rotate, thereby forming a breast prosthesis model from silicone in the container;

The painting device includes a controller, a spray head, and a fixing base, wherein the fixing base is configured to fix the breast prosthesis model, the controller is electrically connected to the data processing device, and the controller is electrically connected to the spray head, and the controller is configured to control the spray head to spray paint on the breast prosthesis model based on the model data.

Optionally, the painting device further includes a robotic arm, a distance measurement module, an optical sensor module, a spray head, and a controller, wherein the robotic arm, the distance measurement module, the optical sensor module, and the spray head are all electrically connected to the controller, the spray head, the distance measurement module, and the optical sensor module are installed on the robotic arm, and the spray head, the distance measurement module, and the optical sensor module are all located on the robotic arm, the distance measurement module is configured to detect the distance between the spray head and the breast prosthesis model;

The controller is configured to control the movement of the robotic arm to drive the optical sensor module to move, thereby determining a working surface for the spray head, wherein the working surface is a curved surface at a set distance from the surface of the breast prosthesis model and having the same shape as the surface of the breast prosthesis model; based on the working surface, control the movement of the robotic arm to drive the spray head and the distance measurement module to move, and based on the distance measurement module, determine a target distance between the spray head and the breast prosthesis model; based on the model data, the working surface, and the target distance, control the spray head to spray paint on the breast prosthesis model.

Optionally, the robotic arm is equipped with a driving motor, the driving motor is connected to the spray head, and the driving motor is electrically connected to the controller;

The controller is further configured to: when the distance between the working surface and the surface of the breast prosthesis model equals the target distance, control the spray head to move along the working surface and spray paint on the breast prosthesis model; when the distance between the working surface and the surface of the breast prosthesis model does not equal the target distance, control the driving motor to move, thereby driving the spray head to move and adjusting the distance between the spray head and the breast prosthesis model until the distance between the spray head and the breast prosthesis model equals the distance between the working surface and the surface of the breast prosthesis model, and then control the spray head to spray paint on the breast prosthesis model.

Optionally, the breast prosthesis model has multiple target areas, and the multiple target areas are adjacent to each other;

The controller is further configured to: obtain the model data of each target area among the multiple target areas; based on the model data of each target area, the working surface, and the target distance, control the spray head to spray paint on the target area.

Optionally, the controller is further configured to: store the target distance;

When the number of target distances equals a preset threshold, based on the target distance corresponding to each model data, control the spray head to spray paint on the breast prosthesis model.

Optionally, the breast prosthesis processing device further includes a base, a first fixing frame, a second fixing frame, a container, a first connecting component, and a second connecting component;

The first fixing frame and the second fixing frame are both slidably connected to the base, and the sliding direction of the first fixing frame is different from the sliding direction of the second fixing frame;

The first fixing frame is equipped with a first rotating part, the second fixing frame is equipped with a second rotating part, the container has a first connecting part and a second connecting part, the first connecting part is connectable to the first rotating part, the second connecting part is connectable to the second rotating part, the container is configured to hold a containment shell, the containment shell is configured to hold a viscous fluid medium, the first rotating part can drive the first connecting part to rotate around the axis of the first rotating part, thereby causing the container to rotate around the axis of the first rotating part, the second rotating part can drive the second connecting part to rotate around the axis of the second rotating part, thereby causing the container to rotate around the axis of the second rotating part;

The first driving motor is installed on the base, the first connecting component and the second connecting component are both fixedly connected to the rotating output shaft of the first driving motor, the first connecting component is connected to the first fixing frame, the second connecting component is connected to the second fixing frame, the first driving motor drives the first connecting component and the second connecting component to rotate, thereby causing the first fixing frame and the second fixing frame to slide relative to the base, the first connecting part is separated from the first rotating part, the second connecting part is connected to the second rotating part, or the first connecting part is connected to the first rotating part, the second connecting part is separated from the second rotating part.

Optionally, the breast prosthesis processing device further includes a second driving motor and a third driving motor;

The second driving motor is installed on the first fixing frame, the third driving motor is installed on the second fixing frame, the second driving motor is connected to the first rotating part, the second driving motor can drive the first rotating part to rotate around the axis of the first rotating part, the third driving motor is connected to the second rotating part, the third driving motor can drive the second rotating part to rotate around the axis of the second rotating part.

Optionally, the first fixing frame is connected to a first connecting rod, the first connecting rod is equipped with a first sliding pin, the first connecting component is equipped with a first sliding groove, the first sliding pin is embedded in the first sliding groove;

The second fixing frame is connected to a second connecting rod, the second connecting rod is equipped with a second sliding pin, the second connecting component is equipped with a second sliding groove, the second sliding pin is embedded in the second sliding groove.

Optionally, the data processing device is further configured to: mark the mirrored feature points on the image of the normal breast; determine the area surrounding the normal breast image based on the mirrored feature points; mirror the surrounding area to obtain a mirrored surrounding area; based on the mirrored surrounding area, generate the model data of the removed breast.

Optionally, the data processing device is further configured to: determine the midline of the human body scan image; mirror the feature points about the midline to obtain the mirrored feature points.

In the embodiments of this application, since the scanner is electrically connected to the data processing device, after the scanner scans the human body to obtain the human body scan image, the scanner can transmit the human body scan image to the data processing device. Since the data processing device, in response to the first input, marks feature points on the image of the residual part after the breast has been removed, mirrors the feature points to obtain the mirrored feature points, and generates the model data of the removed breast based on the mirrored feature points and the image of the normal breast, after the scan image is transmitted to the data processing device, the data processing device can generate the model data of the removed breast. Since the data processing device is electrically connected to the breast prosthesis processing device and the painting device, the data processing device can transmit the model data of the removed breast to the breast prosthesis processing device and the painting device. The breast prosthesis processing device includes a processor, a first driving motor, and a container, the processor is electrically connected to the data processing device, the processor is electrically connected to the first driving motor, so the processor can receive the model data transmitted by the data processing device, and based on the model data, control the first driving motor to drive the container to rotate, after the container rotates, the silicone in the container will rotate with the container, thereby forming a breast prosthesis model, which can then be moved to the painting device. The painting device includes a controller, a spray head, and a fixing base, the fixing base is configured to fix the breast prosthesis model, the controller is electrically connected to the data processing device, so after the controller receives the model data transmitted by the data processing device, the controller can control the spray head to spray paint on the breast prosthesis model based on the model data, thereby forming the breast prosthesis.

That is, in the embodiments of this application, by setting up the scanner, the data processing device, the breast prosthesis processing device, and the painting device, and electrically connecting the scanner to the data processing device, and electrically connecting the data processing device to the breast prosthesis processing device and the painting device, after the scanner scans the human body to obtain the human body scan image, the data processing device can generate the model data of the removed breast based on the human body scan image, and transmit the model data to the breast prosthesis processing device and the painting device, the breast prosthesis processing device can process the breast prosthesis model based on the model data, and after the breast prosthesis model is placed on the painting device, the painting device can spray paint on the breast prosthesis model to form the breast prosthesis, thereby facilitating the formation of the breast prosthesis.

The above description is only an overview of the technical solution of this application. To understand the technical means of this application more clearly, it can be implemented according to the content of the specification. To make the above and other objectives, features, and advantages of this application more obvious and understandable, the specific embodiments of this application are described below.

BRIEF DESCRIPTION OF THE DRAWINGS

To more clearly illustrate the embodiments of this application or the technical solutions in the prior art, the following briefly introduces the drawings required for describing the embodiments or the prior art. Obviously, the drawings in the following description are some embodiments of this application. For those of ordinary skill in the art, other drawings can be obtained based on these drawings without creative effort.

REFERENCE SIGNS

Figure 1:
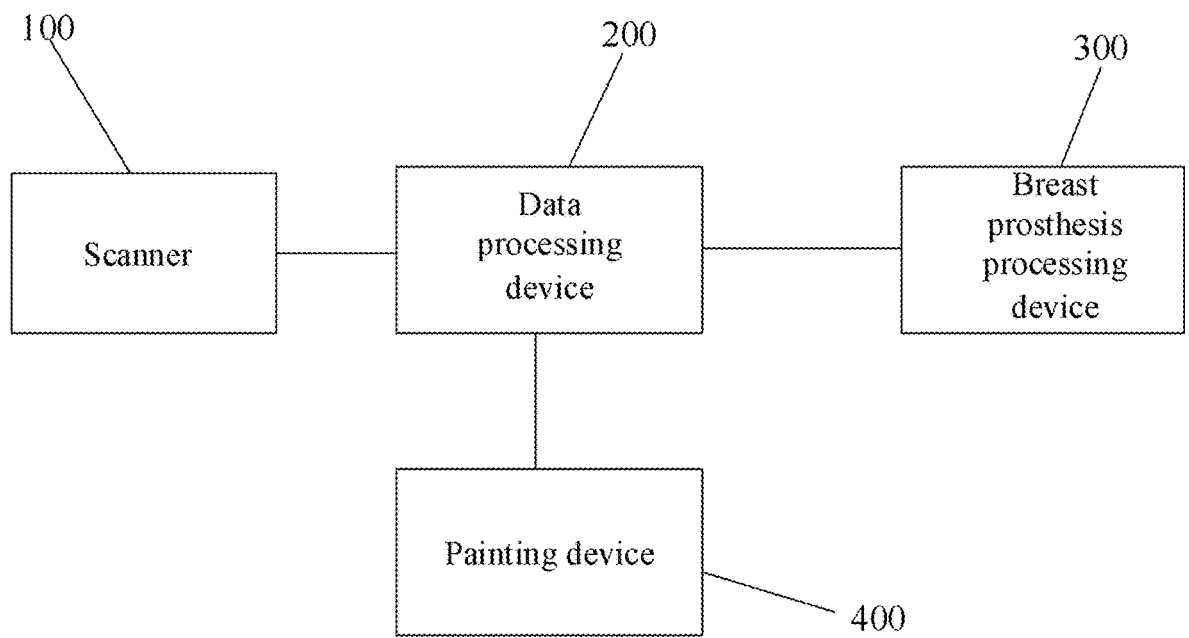
FIG. 1 shows a schematic diagram of a breast prosthesis processing system provided by an embodiment of this application.

100: Scanner; 200: Data processing device; 300: Breast prosthesis processing device; 400: Painting device; 10: Base; 20: First fixing frame; 30: Second fixing frame; 40: Container; 50: First connecting rod; 60: Second connecting rod; 70: First driving component; 80: Second driving component; 90: Third driving component; 11: First sliding rail; 12: Second sliding rail; 21: First rotating part; 22: First counterweight block; 31: Second rotating part; 32: Second counterweight block; 41: First connecting part; 42: Second connecting part; 51: First sliding groove; 61: Second sliding groove; 81: First transmission belt; 91: Second transmission belt; 201: First connecting rod; 301: Second connecting rod; 001: Controller; 002: Robotic arm; 003: Optical sensor module; 004: Spray head; 005: Distance measurement module.

DETAILED DESCRIPTION

To make the objectives, technical solutions, and advantages of the embodiments of the present application clearer, the following clearly and completely describes the technical solutions in the embodiments of the present application with reference to the accompanying drawings in the embodiments of the present application. Obviously, the described embodiments are some, but not all, of the embodiments of the present application. Based on the embodiments of the present application, all other embodiments obtained by those of ordinary skill in the art without creative effort shall fall within the protection scope of the present application.

It should be noted that when an element is referred to as being "fixed to" or "disposed on" another element, it can be directly on the other element or indirectly on the other element. When an element is referred to as being "connected to" another element, it can be directly connected to the other element or indirectly connected to the other element.

In addition, the terms "first," "second," etc., are used for descriptive purposes only and cannot be understood as indicating or implying relative importance or implicitly indicating the number of technical features indicated. Thus, features defined by "first" and "second" may explicitly or implicitly include one or more of the features. In the description of the present application, "a plurality" means two or more, unless otherwise specifically defined.

In the description of the present application, it should be understood that the terms "upper," "lower," "front," "rear," "left," "right," etc., indicate the orientation or positional relationship based on the orientation or positional relationship shown in the drawings, and are only for the convenience of describing the present application and simplifying the description, rather than indicating or implying that the device or element referred to must have a specific orientation, be constructed and operated in a specific orientation, and therefore cannot be understood as a limitation of the present application.

In the description of the present application, it should be noted that unless otherwise explicitly specified and defined, the terms "install," "connect," and "link" should be understood broadly. For example, it can be a fixed connection, a detachable connection, or an integral connection; it can be a mechanical connection or an electrical connection; it can be a direct connection or an indirect connection through an intermediate medium, and it can be the internal communication between two elements or the interaction relationship between two elements. For those of ordinary skill in the art, the specific meanings of the above terms in the present application can be understood according to specific situations.

Referring to FIG. 1, a schematic diagram of a breast prosthesis processing system provided by an embodiment of the present application is shown. As shown in FIG. 1, the breast prosthesis processing system includes: a scanner 100, a data processing device 200, a breast prosthesis processing device 300, and a painting device 400.

The scanner 100 is electrically connected to the data processing device 200, and the data processing device 200 is electrically connected to the breast prosthesis processing device 300 and the painting device 400. The scanner 100 is configured to scan a human body to obtain a human body scan image and transmit the human body scan image to the data processing device 200, wherein the human body scan image includes a scan image of the torso, and the torso scan image includes an image of a normal breast and an image of a residual part after the breast has been removed. The data processing device 200 is configured to, in response to a first input, mark feature points on the image of the residual part after the breast has been removed, mirror the feature points to obtain mirrored feature points, generate model data of the removed breast based on the mirrored feature points and the image of the normal breast, and transmit the model data of the removed breast to the breast prosthesis processing device 300 and the painting device 400. The breast prosthesis processing device 300 includes a processor, a first driving component 70, and a container 40, the processor is electrically connected to the data processing device 200, the processor is electrically connected to the first driving component 70, the processor is configured to control the first driving component 70 based on the model data to drive the container 40 to rotate, thereby forming a breast prosthesis model from silicone in the container 40. The painting device 400 includes a controller 001, a spray head 004, and a fixing base, the fixing base is configured to fix the breast prosthesis model, the controller 001 is electrically connected to the data processing device, and the controller 001 is electrically connected to the spray head 004, the controller 001 is configured to control the spray head 004 to spray paint on the breast prosthesis model based on the model data.

In the embodiments of the present application, since the scanner 100 is electrically connected to the data processing device 200, after the scanner 100 scans the human body to obtain the human body scan image, the scanner 100 can transmit the human body scan image to the data processing device 200. Since the data processing device 200, in response to the first input, marks feature points on the image of the residual part after the breast has been removed, mirrors the feature points to obtain mirrored feature points, and generates the model data of the removed breast based on the mirrored feature points and the image of the normal breast, after the scan image is transmitted to the data processing device 200, the data processing device 200 can generate the model data of the removed breast. Since the data processing device 200 is electrically connected to the breast prosthesis processing device 300 and the painting device 400, the data processing device 200 can transmit the model data of the removed breast to the breast prosthesis processing device 300 and the painting device 400. The breast prosthesis processing device 300 includes a processor, a first driving component 70, and a container 40, the processor is electrically connected to the data processing device 200, the processor is electrically connected to the first driving component 70, so the processor can receive the model data transmitted by the data processing device 200, and based on the model data, control the first driving component 70 to drive the container 40 to rotate, after the container 40 rotates, the silicone in the container 40 will rotate with the container 40, thereby forming a breast prosthesis model, which can then be moved to the painting device 400. The painting device 400 includes a controller 001, a spray head 004, and a fixing base, the fixing base is configured to fix the breast prosthesis model, the controller 001 is electrically connected to the data processing device, so after the controller 001 receives the model data transmitted by the data processing device 200, the controller 001 can control the spray head 004 to spray paint on the breast prosthesis model based on the model data, thereby forming the breast prosthesis.

That is, in the embodiments of the present application, by setting up the scanner 100, the data processing device 200, the breast prosthesis processing device 300, and the painting device 400, and electrically connecting the scanner 100 to the data processing device 200, and electrically connecting the data processing device 200 to the breast prosthesis processing device 300 and the painting device 400, after the scanner 100 scans the human body to obtain the human body scan image, the data processing device 200 can generate the model data of the removed breast based on the human body scan image, and transmit the model data to the breast prosthesis processing device 300 and the painting device 400, the breast prosthesis processing device 300 can process the breast prosthesis model based on the model data, and after the breast prosthesis model is placed on the painting device 400, the painting device 400 can spray paint on the breast prosthesis model to form the breast prosthesis, thereby facilitating the formation of the breast prosthesis.

It should be noted that the data processing device 200 can be a processing chip, the controller 001 can be a programmable logic controller, and the processor can be a chip.

Figure 2:
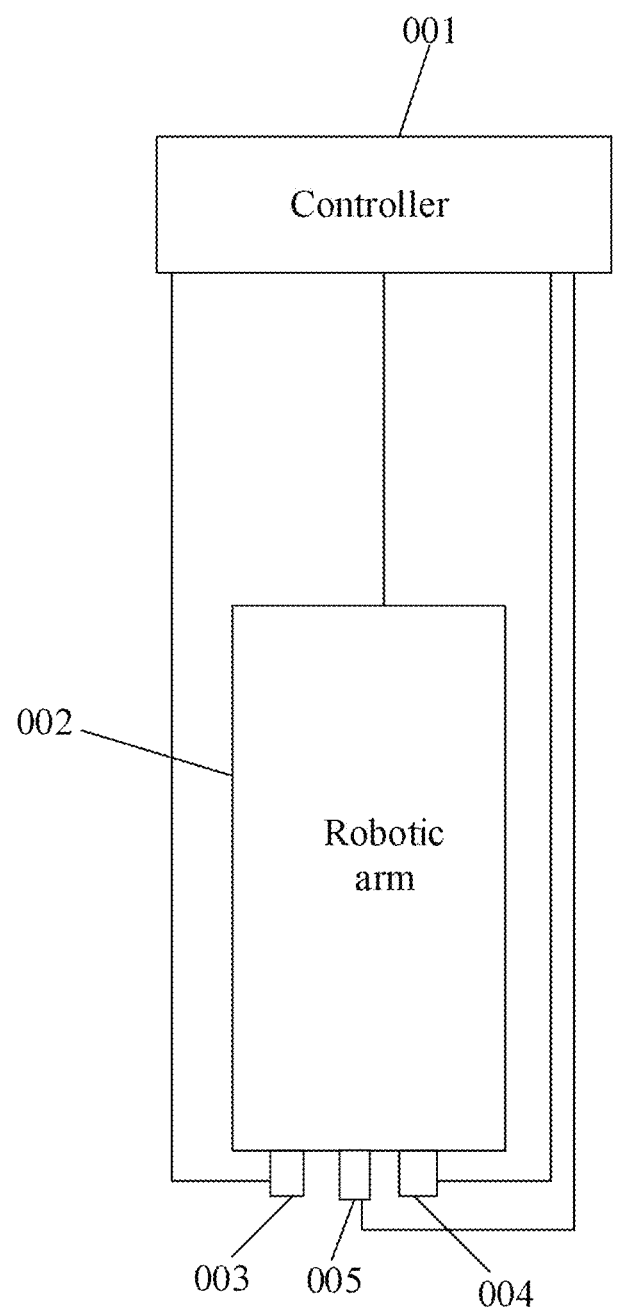
FIG. 2 shows a schematic diagram of a painting device provided by an embodiment of this application.
Figure 3:
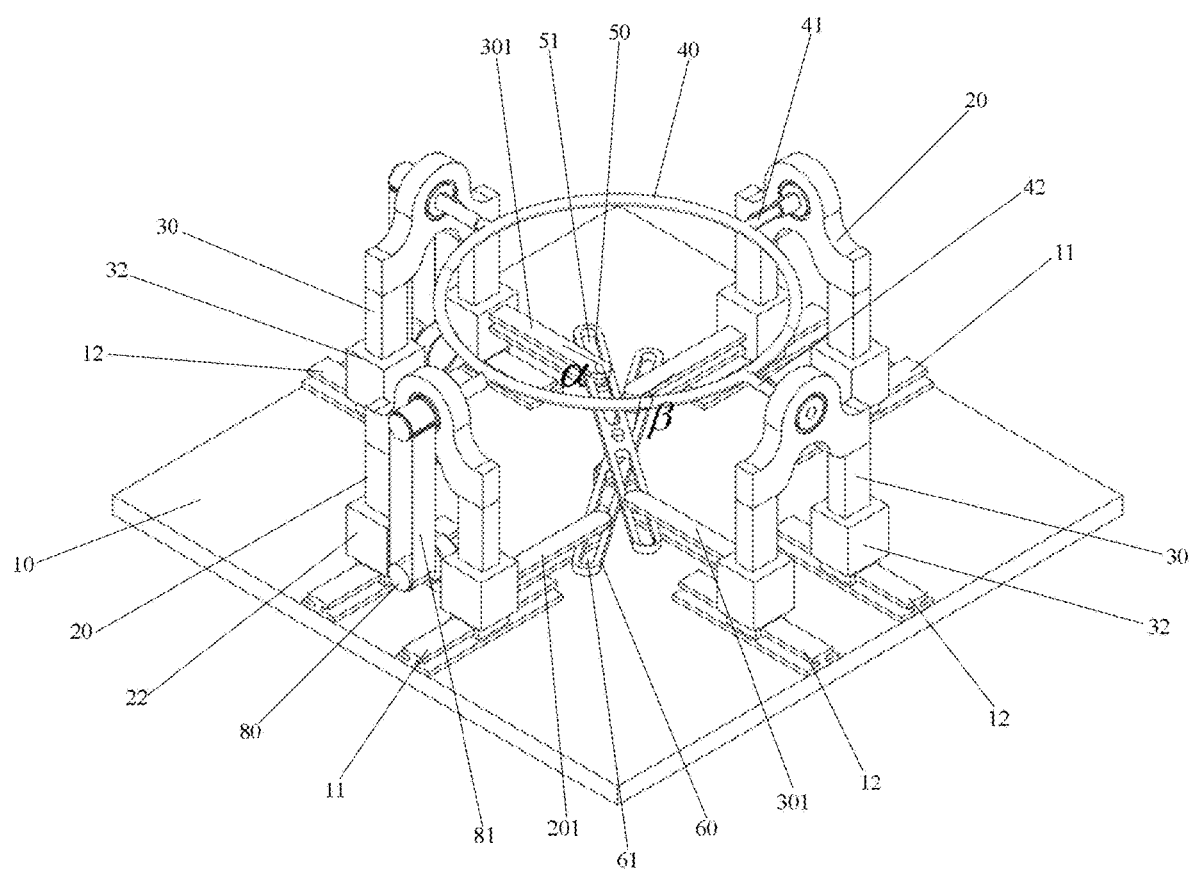
FIG. 3 shows a first schematic diagram of a breast prosthesis processing device provided by an embodiment of this application.
Figure 4:
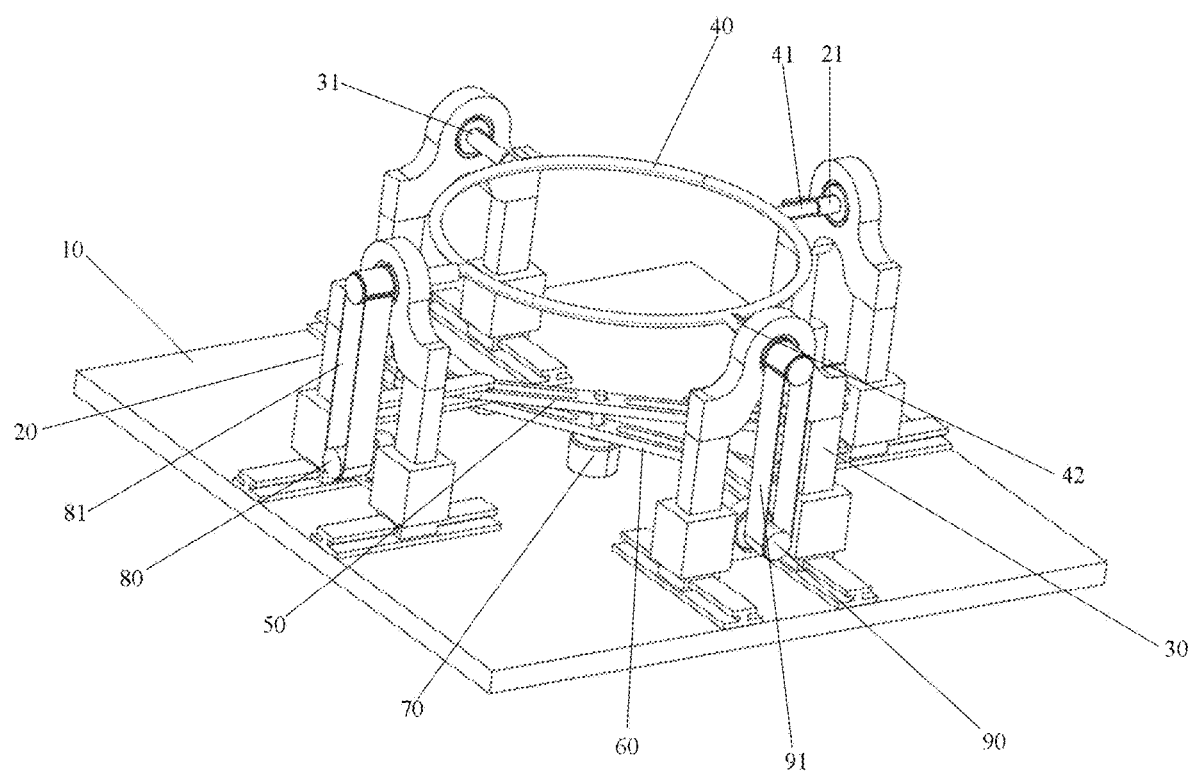
FIG. 4 shows a second schematic diagram of a breast prosthesis processing device provided by an embodiment of this application.

In addition, in some embodiments, as shown in FIG. 2, the painting device 400 can further include a controller 001, a robotic arm 002, an optical sensor module 003, a spray head 004, and a distance measurement module 005, the robotic arm 002, the distance measurement module 40, the optical sensor module 003, and the spray head 004 are all electrically connected to the controller 001, the spray head 004, the distance measurement module 40, and the optical sensor module 003 are installed on the robotic arm 002, and the spray head 004, the distance measurement module 40, and the optical sensor module 003 are all located on the robotic arm 002, the distance measurement module 40 is configured to detect the distance between the spray head and the breast prosthesis model. The controller 001 is configured to: control the movement of the robotic arm 002 to drive the optical sensor module 003 to move, thereby determining a working surface for the spray head 004, wherein the working surface is a curved surface at a set distance from the surface of the breast prosthesis model and having the same shape as the surface of the breast prosthesis model; based on the working surface, control the movement of the robotic arm 002 to drive the spray head 004 and the distance measurement module 005 to move, and based on the distance measurement module 005, determine a target distance between the spray head 004 and the breast prosthesis model; based on the model data, the working surface, and the target distance, control the spray head 004 to spray paint on the breast prosthesis model. The controller 001 is electrically connected to the data processing device 200.

Since the robotic arm 002 is electrically connected to the controller 001, the controller 001 can control the movement of the robotic arm 002. Since the optical sensor module 003, the spray head 004, and the distance measurement module 005 are all installed on the robotic arm 002, when the robotic arm 002 moves, the robotic arm 002 can drive the optical sensor module 003, the spray head 004, and the distance measurement module 005 to move. Since the optical sensor module 003, the spray head 004, and the distance measurement module 005 are all electrically connected to the controller 001, after the controller 001 obtains the model data of the removed breast, the controller 001 can control the movement of the robotic arm 002, the robotic arm 002 will drive the optical sensor module 003, the spray head 004, and the distance measurement module 005 to move, specifically, the robotic arm 002 can move around the breast prosthesis model, so the optical sensor module 003 can determine the working surface for the spray head 004 as it moves with the robotic arm 002, the working surface is a curved surface at a set distance from the surface of the breast prosthesis model and having the same shape as the surface of the breast prosthesis model. After determining the working surface, the controller 001 can control the movement of the robotic arm 002 to drive the spray head 004 and the distance measurement module 005 to move, based on the distance measurement module 005, determine the target distance between the spray head 004 and the breast prosthesis model. Then the controller can control the spray head 004 to spray paint on the breast prosthesis model based on the model data, the working surface, and the target distance.

In addition, in some embodiments, the robotic arm 002 is equipped with a driving motor, the driving motor is connected to the spray head 004, and the driving motor is electrically connected to the controller 001. The controller 001 is further configured to: when the distance between the working surface and the surface of the breast prosthesis model equals the target distance, control the spray head 004 to move along the working surface and spray paint on the breast prosthesis model; when the distance between the working surface and the surface of the breast prosthesis model does not equal the target distance, control the driving motor to move, thereby driving the spray head 004 to move and adjusting the distance between the spray head 004 and the breast prosthesis model until the distance between the spray head 004 and the breast prosthesis model equals the distance between the working surface and the surface of the breast prosthesis model, and then control the spray head 004 to spray paint on the breast prosthesis model. That is, the controller 001 controls the driving motor to drive the spray head 004 to move, so that the nozzle of the spray head is always at a constant distance from the surface of the breast prosthesis model, thereby making the paint on the breast prosthesis model more uniform and improving the aesthetics of the breast prosthesis model.

In addition, in some embodiments, the breast prosthesis model can have multiple target areas, and the multiple target areas are adjacent to each other. At this time, the model data of each target area among the multiple target areas is obtained. That is, the breast prosthesis model is divided into multiple target areas, and the data of the multiple target areas is obtained, wherein one target area can correspond to one data packet, that is, multiple data packets can be obtained, so that when performing other operations based on the model data, the operations can be performed according to the model data in a single data packet, thereby simplifying the processing of the controller 001 and avoiding the problem of slow operation of the controller 001 due to processing a large amount of data at once.

In addition, after obtaining the model data of the breast prosthesis model, the controller 001 can determine the shape, contour, color, and other characteristics of the breast prosthesis model, so the controller 001 can control the movement of the robotic arm 002 to move the robotic arm 002 to the breast prosthesis model, and in the process of controlling the movement of the robotic arm 002, make the optical sensor module 003 face the breast prosthesis model, and the spray head 004 face the breast prosthesis model, so the spray head 004 moves to the target position. That is, the target position is the position where the nozzle of the spray head 004 faces the breast prosthesis model, so paint can be sprayed on the breast prosthesis model.

It should be noted that the model data of the breast prosthesis model is essentially the model data of the removed breast.

In addition, in the embodiments of the present application, the detection end of the distance measurement module 005 faces the front of the nozzle of the spray head 004, and the detection point of the distance measurement module 005 is located directly in front of the nozzle. Therefore, the controller 001 can first obtain the initial distance between the distance measurement module 005 and the breast prosthesis model; then obtain the placement distance between the distance measurement module 005 and the breast prosthesis model; based on the initial distance and the placement distance, determine the target distance between the spray head 004 and the breast prosthesis model.

Specifically, the distance measurement module 005 can detect the initial distance between itself and the breast prosthesis model, and the detection point of the distance measurement module 005 is located directly in front of the nozzle, which means that when the distance measurement module 005 emits detection light, the detection light is tilted relative to the distance measurement module 005 itself, and the light will be located directly in front of the spray head 004, so the detection point of the distance measurement module 005 coincides with the centerline of the spray head 004, that is, the detection point is located on the extension line of the centerline of the spray head 004. In addition, the distance measurement module 005 is electrically connected to the controller 001, after the distance measurement module 005 detects the initial distance between itself and the breast prosthesis model, it can transmit the initial distance to the controller 001 in real time, so the controller 001 can obtain the initial distance between the distance measurement module 005 and the breast prosthesis model.

In addition, the distance measurement module 005 and the spray head 004 are both installed on the robotic arm 002, so the placement distance between the distance measurement module 005 and the spray head 004 can be measured in advance, and the placement distance can be stored in the storage area of the controller 001, so the controller 001 can directly obtain the placement distance between the distance measurement module 005 and the spray head 004.

In addition, after the controller 001 obtains the initial distance and the placement distance, it can determine the target distance between the spray head 004 and the breast prosthesis model based on the initial distance and the placement distance.

In addition, the method for determining the target distance between the spray head 004 and the breast prosthesis model based on the initial distance and the placement distance can be: determining the square root of the difference between the square of the initial distance and the square of the placement distance, and the square root is the target distance between the spray head 004 and the breast prosthesis model.

Wherein, since the detection point of the optical sensor module 003 is located on the extension line of the centerline of the spray head 004, the placement distance, the initial distance, and the target distance form the three sides of a right triangle, the initial distance is the hypotenuse, the placement distance is one of the right-angle sides, and the target distance is the other right-angle side. Therefore, the square root of the difference between the square of the initial distance and the square of the placement distance is equivalent to subtracting the square of one right-angle side from the square of the hypotenuse, and then taking the square root of the difference to obtain the length of the other right-angle side. Therefore, the square root of the difference between the square of the initial distance and the square of the placement distance can be determined, and the square root is the target distance between the spray head 004 and the breast prosthesis model.

Figure 5:
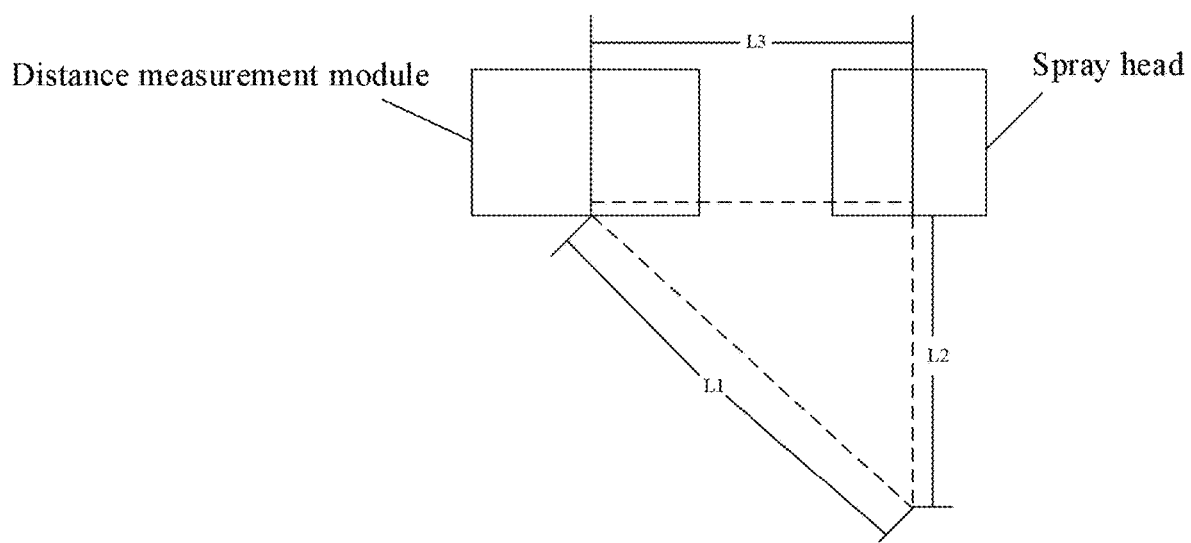
FIG. 5 shows a schematic diagram of a distance measurement principle provided by an embodiment of this application.

For example, as shown in FIG. 5, the initial distance is L1, the placement distance is L3, and the target distance between the spray head 004 and the breast prosthesis model is L2, L2 is equal to the square root of the difference between the square of L1 and the square of L3, that is, L1, L2, and L3 form a right triangle, L1 is the hypotenuse of the right triangle, L3 is one of the right-angle sides of the right triangle, and L2 is the other right-angle side of the right triangle.

In addition, in the embodiments of the present application, the breast prosthesis model can have multiple target areas, and the multiple target areas are adjacent to each other, the controller 001 is further configured to: obtain the model data of each target area among the multiple target areas, and based on the model data of each target area and the target distance, control the spray head 004 to spray paint on the target area. That is, the breast prosthesis model is divided into multiple target areas, and the data of the multiple target areas is obtained, wherein one target area can correspond to one data packet, that is, multiple data packets can be obtained, so that when performing other operations based on the model data, the operations can be performed according to the model data in a single data packet, thereby simplifying the processing of the controller 001 and avoiding the problem of slow operation of the controller 001 due to processing a large amount of data at once.

In addition, after obtaining the model data of each target area, the controller 001 can process each data packet one by one, so the amount of data processed by the controller 001 is smaller, which is beneficial to improving the operation speed of the controller 001. In addition, after obtaining the model data of each target area and the target distance, the controller 001 can control the spray head 004 to spray paint on the multiple target areas in sequence according to a preset order.

For example, the breast prosthesis model has 5 target areas, after the controller 001 obtains the model data of the 5 target areas, it can sort the model data of the 5 target areas based on the order in which the model data of the 5 target areas is obtained, and then spray paint on the target areas corresponding to the 5 model data in sequence.

In addition, in the embodiments of the present application, the controller 001 can control the movement of the robotic arm 002 to make the target distance within a preset threshold range, and based on the model data and the target distance, control the spray head 004 to spray paint on the breast prosthesis model. That is, by making the target distance within the preset threshold range, it can ensure that the color of the paint sprayed on different positions of the breast prosthesis model is less affected by the distance, which is beneficial to spraying paint on the breast prosthesis model.

In addition, in some implementations, the robotic arm 002 is equipped with a driving motor, the driving motor is connected to the spray head 004, and the driving motor is electrically connected to the controller 001. The controller 001 is further configured to: based on the model data and the target distance, control the driving motor to move, thereby driving the spray head 004 to move to an adjustment position; control the spray head 004 to spray paint on the breast prosthesis model at the adjustment position.

Wherein, after the controller 001 controls the robotic arm 002 to move to the target position, there may be a deviation between the position of the spray head 004 and the position of the point to be sprayed on the breast prosthesis model. At this time, the driving motor can be controlled to move, thereby driving the spray head 004 to move, which is equivalent to the driving motor fine-tuning the position of the spray head 004, so that the spray head 004 is directly facing the point to be sprayed on the breast prosthesis model, which can ensure that the spray head 004 can accurately spray paint on the point to be sprayed, and is beneficial to improving the processing quality of the breast prosthesis.

For example, the controller 001 can control the movement of the robotic arm 002 first, and then control the driving motor to run, thereby driving the spray head 004 to move and fine-tuning the position of the spray head 004.

It should be noted that the driving motor can be a stepper motor, a servo motor, etc., and the specific type of the driving motor is not limited in the embodiments of the present application.

In addition, in the embodiments of the present application, when the distance between the nozzle and the surface of the breast prosthesis model is within a set distance range, the spray head can be directly controlled to spray paint on the breast prosthesis model. When the distance between the nozzle and the surface of the breast prosthesis model is outside the set distance range, the robotic arm can be controlled to move, thereby driving the nozzle to move and adjusting the distance between the nozzle and the surface of the breast prosthesis model until the distance between the nozzle and the surface of the breast prosthesis model is within the set distance range.

Wherein, the set distance range can be set according to actual needs, for example, the set distance range can be 0.9 mm to 1.1 mm, or the set distance range can be 0.8 mm to 1.2 mm.

In addition, in the embodiments of the present application, the robotic arm 002 is equipped with a sliding rail, the spray head 004 is installed on the sliding rail, and the driving motor is configured to drive the spray head 004 to slide along the sliding rail, thereby moving the spray head 004 to the adjustment position.

Since the spray head 004 is installed on the sliding rail, when the driving motor runs, the driving motor will drive the spray head 004 to slide along the sliding rail, thereby adjusting the position of the spray head 004, that is, fine-tuning the position of the spray head 004, so that the spray head 004 can accurately spray paint on the breast prosthesis model. That is, by setting the sliding rail, it is convenient for the spray head 004 to move.

It should be noted that the shape of the sliding rail can be set according to actual needs, for example, the sliding rail can be cross-shaped, T-shaped, or circular. The specific shape of the sliding rail is not limited in the embodiments of the present application.

In addition, in some embodiments, the controller 001 is further configured to: store the target distance; when the number of target distances equals a preset threshold, based on the target distance corresponding to each model data, control the spray head 004 to spray paint on the breast prosthesis model.

Wherein, the preset threshold can be the number of data corresponding to the optimal processing speed of the controller 001. Therefore, when the number of target distances equals the preset threshold, the controller can control the movement of the robotic arm 002 more accurately based on the multiple target distances, and the processing speed of the controller 001 is faster during the control process, which improves the efficiency of spraying paint on the breast prosthesis model and is beneficial to improving the processing efficiency of the breast prosthesis.

In addition, in some embodiments, the breast prosthesis processing device 300 further includes a base 10, a first fixing frame 20, a second fixing frame 30, a first connecting rod 50, and a second connecting rod 60. The first fixing frame 20 and the second fixing frame 30 are both slidably connected to the base 10, and the sliding direction of the first fixing frame 20 is different from the sliding direction of the second fixing frame 30. The first fixing frame 20 is equipped with a first rotating part 21, the second fixing frame 30 is equipped with a second rotating part 31, the container 40 has a first connecting part 41 and a second connecting part 42, the first connecting part 41 is connectable to the first rotating part 21, the second connecting part 42 is connectable to the second rotating part 31, the container 40 is configured to hold the item to be stirred, the first rotating part 21 can drive the first connecting part 41 to rotate around the first direction, thereby causing the container 40 to rotate around the first direction, the second rotating part 31 can drive the second connecting part 42 to rotate around the second direction, thereby causing the container 40 to rotate around the second direction. The first driving component 70 is installed on the base 10, the first connecting rod 50 and the second connecting rod 60 are both connected to the transmission shaft of the first driving component 70, the first connecting rod 50 is connected to the first fixing frame 20, and the second connecting rod 60 is connected to the second fixing frame 30.

The processor controls the first driving component 70 to drive the first connecting rod 50 and the second connecting rod 60 to rotate, thereby causing the first fixing frame 20 and the second fixing frame 30 to slide relative to the base 10, the first connecting part 41 is separated from the first rotating part 21, the second connecting part 42 is connected to the second rotating part 31, or the first connecting part 41 is connected to the first rotating part 21, the second connecting part 42 is separated from the second rotating part 31.

In the embodiments of the present application, since both the first fixing frame 20 and the second fixing frame 30 are slidably connected to the base 10, the first fixing frame 20 and the second fixing frame can slide on the base 10. Since the first fixing frame 20 is provided with a first rotating part 21, the second fixing frame is provided with a second rotating part 31, and the container 40 is provided with a first connecting part 41 and a second connecting part 42, the first connecting part 41 can be connected to the first rotating part 21, and the second connecting part 42 can be connected to the second rotating part 31, when the first connecting part 41 is connected to the first rotating part 21, the first rotating part 21 can drive the first connecting part 41 to rotate around a first direction, thereby causing the container 40 to rotate around the first direction. When the second connecting part 42 is connected to the second rotating part 31, the second rotating part 31 can drive the second connecting part 42 to rotate around a second direction, thereby causing the container 40 to rotate around the second direction. Since the first driving component 70 is installed on the base 10, and both the first connecting rod 50 and the second connecting rod 60 are connected to the transmission shaft of the first driving component 70, the first connecting rod 50 is connected to the first fixing frame 20, and the second connecting rod 60 is connected to the second fixing frame 30, when the first driving component 70 operates, the transmission shaft of the first driving component 70 can drive the first connecting rod 50 and the second connecting rod 60 to rotate, the first connecting rod 50 drives the first fixing frame 20 to slide on the base 10, and the second connecting rod 60 drives the second fixing frame 30 to slide on the base 10. The sliding direction of the first fixing frame 20 is different from the sliding direction of the second fixing frame 30. Therefore, when the first fixing frame slides, the first rotating part 21 on the first fixing frame can be connected to the first connecting part 41 of the container 40, and the second rotating part 31 on the second fixing frame can be separated from the second connecting part 42 of the container 40, so that the first rotating part 21 can drive the first connecting part 41 to rotate around the first direction, thereby causing the container 40 to rotate around the first direction. Alternatively, the first rotating part 21 on the first fixing frame can be separated from the first connecting part 41 of the container 40, and the second rotating part 31 on the second fixing frame can be connected to the second connecting part 42 of the container 40, so that the second rotating part 31 can drive the second connecting part 42 to rotate around the second direction, thereby causing the container 40 to rotate around the second direction.

That is, in the embodiments of the present application, by providing the first fixing frame 20 and the second fixing frame 30, and both the first fixing frame 20 and the second fixing frame 30 are slidably connected to the base 10, the first connecting part 41 of the container 40 can be connected to the first rotating part 21 of the first fixing frame 20, and the second connecting part 42 of the container 40 can be connected to the second rotating part 31 of the second fixing frame 30, and both the first connecting rod 50 and the second connecting rod 60 are connected to the transmission shaft of the first driving component 70, the first connecting rod 50 is connected to the first fixing frame 20, and the second connecting rod 60 is connected to the second fixing frame 30, when it is necessary to stir the material to be stirred, the material to be stirred can be placed in the container 40, and then the first driving component 70 can drive the first connecting rod 50 and the second connecting rod 60 to rotate, so that the first connecting part 41 of the container 40 is connected to the first rotating part 21 of the first fixing frame 20, and the second connecting part 42 of the container 40 is separated from the second rotating part 31 of the second fixing frame 30, the first rotating part 21 can drive the first connecting part 41 to rotate around the first direction, thereby causing the container 40 to rotate around the first direction, so that the material to be stirred rotates around the first direction. Then, the first driving component 70 can continue to operate, and the first driving component 70 drives the first connecting rod 50 and the second connecting rod 60 to rotate, so that the first connecting part 41 of the container 40 is separated from the first rotating part 21 of the first fixing frame 20, and the second connecting part 42 of the container 40 is connected to the second rotating part 31 of the second fixing frame 30, the second rotating part 31 can drive the second connecting part 42 to rotate around the second direction, thereby causing the container 40 to rotate around the second direction, so that the material to be stirred rotates around the second direction. That is, the material to be stirred can be rotated in two directions, so that the material to be stirred can be stirred more evenly.

It should be noted that when making devices with silicone, for example, when making breast prostheses with silicone, the silicone needs to be stirred evenly. At this time, the silicone can be placed in a breast prosthesis mold, and then the breast prosthesis mold can be placed in the container 40, and then the first driving component 70 can drive the first connecting rod 50 and the second connecting rod 60, so that the first connecting part 41 of the container 40 is connected to the first rotating part 21 of the first fixing frame 20, and the second connecting part 42 of the container 40 is separated from the second rotating part 31 of the second fixing frame 30, so that the first rotating part 21 can drive the container 40 to rotate around the first direction, thereby causing the silicone in the breast prosthesis mold to rotate around the first direction. Then, the first driving component 70 can drive the first connecting rod 50 and the second connecting rod 60, so that the first connecting part 41 of the container 40 is separated from the first rotating part 21 of the first fixing frame 20, and the second connecting part 42 of the container 40 is connected to the second rotating part 31 of the second fixing frame 30, so that the second rotating part 31 can drive the container 40 to rotate around the second direction, thereby causing the silicone in the breast prosthesis mold to rotate around the second direction. By rotating the breast prosthesis mold multiple times, the silicone in the breast prosthesis mold can be stirred evenly, which is beneficial to the processing of breast prostheses.

In addition, in the embodiments of the present application, the first driving component 70 can be a stepper motor. Of course, the first driving component 70 can also be of other types, for example, the first driving component 70 can also be a servo motor. The specific type of the first driving component 70 is not limited in the embodiments of the present application.

In addition, in the embodiments of the present application, the number of the first connecting parts 41 is equal to the number of the first rotating parts 21. The number of the first connecting parts 41 can be set according to actual needs. For example, as shown in FIG. 1, the number of the first connecting parts 41 is two, and the two first connecting parts 41 are located opposite to each other. At this time, the number of the first fixing frames 20 can be two, and each first fixing frame 20 is provided with a first rotating part 21. The number of the second connecting parts 42 is equal to the number of the second rotating parts 31. The number of the second connecting parts 42 can be set according to actual needs. For example, as shown in FIG. 1, the number of the second connecting parts 42 is two, and the two second connecting parts 42 are located opposite to each other. At this time, the number of the second fixing frames 30 can be two, and each second fixing frame 30 is provided with a second rotating part 31.

In addition, in the embodiments of the present application, the first direction and the second direction can intersect, that is, there is an angle between the first direction and the second direction. For example, the angle between the first direction and the second direction is 90 degrees, that is, the first direction and the second direction are perpendicular to each other. For another example, the angle between the first direction and the second direction is 60 degrees. In addition, the sliding direction of the first fixing frame 20 can be parallel to the first direction, and the sliding direction of the second fixing frame 30 can be parallel to the second direction. Therefore, when the angle between the first direction and the second direction is different, the sliding direction of the first fixing frame 20 is different from the sliding direction of the second fixing frame 30.

In addition, in some embodiments, the container 40 can be a container frame, and the outer wall of the container frame is provided with the first connecting part 41 and the second connecting part 42. The shape of the container frame can be set according to actual needs. For example, the cross-sectional shape of the container frame can be circular, elliptical, square, or rhombus. The specific shape of the cross-section of the container frame is not limited in the embodiments of the present application.

In addition, in some embodiments, the breast prosthesis processing device 300 further includes a second driving component 80 and a third driving component 90. The second driving component 80 is disposed on the first fixing frame 20, and the third driving component 90 is disposed on the second fixing frame 30. The second driving component 80 is connected to the first rotating part 21 and is capable of driving the first rotating part 21 to rotate in a first direction. The third driving component 90 is connected to the second rotating part 31 and is capable of driving the second rotating part 31 to rotate in a second direction.

Since the second driving component 80 is disposed on the first fixing frame 20 and is connected to the first rotating part 21, the second driving component 80 can drive the first rotating part 21 to rotate in the first direction, thereby facilitating the rotation of the first rotating part 21 in the first direction. Since the third driving component 90 is disposed on the second fixing frame 30 and is connected to the second rotating part 31, the third driving component 90 can drive the second rotating part 31 to rotate in the second direction, thereby facilitating the rotation of the second rotating part 31 in the second direction.

It should be noted that the second driving component 80 may be a stepper motor. Alternatively, the second driving component 80 may be of other types, such as a servo motor. The specific type of the second driving component 80 is not limited in this embodiment of the application. Similarly, the third driving component 90 may be a stepper motor. Alternatively, the third driving component 90 may be of other types, such as a servo motor. The specific type of the third driving component 90 is not limited in this embodiment of the application.

Furthermore, in this embodiment of the application, when the breast prosthesis processing device 300 includes the second driving component 80 and the third driving component 90, and the second driving component 80 is connected to the first rotating part 21 while the third driving component 90 is connected to the second rotating part 31, the following process can be implemented when it is necessary to mix the material to be stirred: the material to be stirred is placed in the container 40, and then the first driving component 70 drives the first connecting rod 50 and the second connecting rod 60 to rotate, causing the first fixing frame 20 and the second fixing frame 30 to slide on the base 10. This results in the first connecting part 41 of the first fixing frame 20 being connected to the first rotating part 21 of the container 40, while the second connecting part 42 of the second fixing frame 30 is disconnected from the second rotating part 31 of the container 40. The second driving component 80 can then drive the first rotating part 21 to rotate in the first direction, causing the container 40 to rotate in the first direction. During this rotation, the drive shaft of the second driving component 80 can rotate clockwise, causing the container 40 to rotate forward in the first direction, or rotate counterclockwise, causing the container 40 to rotate backward in the first direction. Specifically, the second driving component 80 can be pre-configured such that its drive shaft rotates clockwise during a first preset time period and then rotates counterclockwise during a second preset time period, thereby causing the container 40 to rotate forward in the first direction during the first preset time period and backward in the first direction during the second preset time period, ensuring more uniform mixing of the material in the container 40.

Subsequently, the first connecting part 41 of the first fixing frame 20 can be disconnected from the first rotating part 21 of the container 40, while the second connecting part 42 of the second fixing frame 30 is connected to the second rotating part 31 of the container 40. The third driving component 90 can then drive the second rotating part 31 to rotate in the second direction, causing the container 40 to rotate in the second direction. During this rotation, the drive shaft of the third driving component 90 can rotate clockwise, causing the container 40 to rotate forward in the second direction, or rotate counterclockwise, causing the container 40 to rotate backward in the second direction. Specifically, the third driving component 90 can be pre-configured such that its drive shaft rotates clockwise during a third preset time period and then rotates counterclockwise during a fourth preset time period, thereby causing the container 40 to rotate forward in the second direction during the third preset time period and backward in the second direction during the fourth preset time period, ensuring more uniform mixing of the material in the container 40.

For example, when the first connecting part 41 of the first fixing frame 20 is connected to the first rotating part 21 of the container 40, and the second connecting part 42 of the second fixing frame 30 is disconnected from the second rotating part 31 of the container 40, the drive shaft of the second driving component 80 rotates clockwise for 10 seconds, causing the container 40 to rotate forward in the first direction, and then rotates counterclockwise for the next 10 seconds, causing the container 40 to rotate backward in the first direction. Subsequently, the third driving component 90 can be activated, causing the first connecting part 41 of the first fixing frame 20 to disconnect from the first rotating part 21 of the container 40, and the second connecting part 42 of the second fixing frame 30 to connect to the second rotating part 31 of the container 40. The drive shaft of the third driving component 90 then rotates clockwise for 10 seconds, causing the container 40 to rotate forward in the second direction, and then rotates counterclockwise for the next 10 seconds, causing the container 40 to rotate backward in the second direction.

In addition, in some embodiments, the second driving component 80 can be connected to the first rotating part 21 via a first transmission belt 81, and the third driving component 90 can be connected to the second rotating part 31 via a second transmission belt 91.

Furthermore, in some embodiments, the base 10 can be provided with a first sliding rail 11 and a second sliding rail 12, where the extension direction of the first sliding rail 11 is different from that of the second sliding rail 12. The first fixing frame 20 is provided with a first slider, which is embedded in the first sliding rail 11, allowing the first fixing frame 20 to slide relative to the base 10. The second fixing frame 30 is provided with a second slider, which is embedded in the second sliding rail 12, allowing the second sliding rail 12 to slide relative to the base 10.

Moreover, in some embodiments, the first fixing frame 20 is connected to a first connecting rod 201, which is provided with a first sliding protrusion. The first connecting rod 50 is provided with a first sliding groove 51, and the first sliding protrusion is embedded in the first sliding groove 51. The second fixing frame 30 is connected to a second connecting rod 301, which is provided with a second sliding protrusion. The second connecting rod 60 is provided with a second sliding groove 61, and the second sliding protrusion is embedded in the second sliding groove 61.

When the first connecting rod 201 is provided with the first sliding protrusion, and the first connecting rod 50 is provided with the first sliding groove 51, with the first sliding protrusion embedded in the first sliding groove 51, the following occurs: when the first connecting rod 50 is driven to rotate by the first driving component 70, the wall of the first sliding groove 51 exerts a force on the first sliding protrusion, causing the first sliding protrusion to drive the first fixing frame 20 to slide. Similarly, when the second connecting rod 301 is provided with the second sliding protrusion, and the second connecting rod 60 is provided with the second sliding groove 61, with the second sliding protrusion embedded in the second sliding groove 61, the following occurs: when the second connecting rod 60 is driven to rotate by the first driving component 70, the wall of the second sliding groove 61 exerts a force on the second sliding protrusion, causing the second sliding protrusion to drive the second fixing frame 30 to slide. Additionally, by providing the first sliding groove 51 on the first connecting rod 50 and the first sliding protrusion on the first connecting rod 201, with the first sliding protrusion embedded in the first sliding groove 51, the first sliding groove 51 can also serve to limit the movement of the first sliding protrusion, preventing it from disengaging from the first sliding groove 51. Furthermore, after the first connecting rod 50 rotates, the wall of the first sliding groove 51 exerts a force on the first sliding protrusion, causing the first fixing frame 20 to slide. Similarly, by providing the second sliding groove 61 on the second connecting rod 60 and the second sliding protrusion on the second connecting rod 301, with the second sliding protrusion embedded in the second sliding groove 61, the second sliding groove 61 can also serve to limit the movement of the second sliding protrusion, preventing it from disengaging from the second sliding groove 61. Additionally, after the second connecting rod 60 rotates, the wall of the second sliding groove 61 exerts a force on the second sliding protrusion, causing the second fixing frame 30 to slide.

In addition, in some embodiments, the angle between the first connecting rod 201 and the first link 50 may be an obtuse angle, and the angle between the second connecting rod 301 and the second link 60 may also be an obtuse angle.

Since the angle between the first connecting rod 201 and the first link 50 is an obtuse angle, and the angle between the second connecting rod 301 and the second link 60 is also an obtuse angle, when the first connecting rod 201 and the second connecting rod 301 are driven by the first driving component 70, the first link 50 can drive the first fixing frame 20 away from the first driving component 70 through the first sliding groove 51 and the first sliding protrusion, and the second link 60 can drive the second fixing frame 30 toward the first driving component 70 through the second sliding groove 61 and the second sliding protrusion, thereby separating the first connecting part 41 of the first fixing frame 20 from the first connecting part 41 of the container 40 and connecting the second connecting part 42 of the second fixing frame 30 to the second connecting part 42 of the container 40. Alternatively, the first link 50 can drive the first fixing frame 20 toward the first driving component 70 through the first sliding groove 51 and the first sliding protrusion, and the second link 60 can drive the second fixing frame 30 away from the first driving component 70 through the second sliding groove 61 and the second sliding protrusion, thereby connecting the first connecting part 41 of the first fixing frame 20 to the first connecting part 41 of the container 40 and separating the second connecting part 42 of the second fixing frame 30 from the second connecting part 42 of the container 40. That is, by setting the angle between the first connecting rod 201 and the first link 50 as an obtuse angle and the angle between the second connecting rod 301 and the second link 60 as an obtuse angle, it is beneficial to separate the second rotating part 31 of the second fixing frame 30 from the second connecting part 42 when the first rotating part 21 of the first fixing frame 20 is connected to the first connecting part 41, or to connect the second rotating part 31 of the second fixing frame 30 to the second connecting part 42 when the first rotating part 21 of the first fixing frame 20 is separated from the first connecting part 41.

In addition, in some embodiments, the first connecting part 41 and the second connecting part 42 may both be metal connecting parts. The first rotating part 21 is provided with a first electromagnetic structure, and the first electromagnetic structure is configured to attract the first connecting part 41 to ensure a tight connection between the first connecting part 41 and the first rotating part 21. The second rotating part 31 is provided with a second electromagnetic structure, and the second electromagnetic structure is configured to attract the second connecting part 42 to ensure a tight connection between the second connecting part 42 and the second rotating part 31.

Since the first rotating part 21 is provided with the first electromagnetic structure and the first connecting part 41 is a metal connecting part, when the container 40 rotates to the first rotating part 21 and the first connecting part 41 is connected to the first rotating part 21, the first electromagnetic structure can be energized to generate a magnetic force to attract the first connecting part 41, ensuring a tight connection between the first connecting part 41 and the first rotating part 21 and preventing the first connecting part 41 from separating from the first rotating part 21 during the rotation of the first rotating part 21. Since the second rotating part 31 is provided with the second electromagnetic structure and the second connecting part 42 is a metal connecting part, when the container 40 rotates to the second rotating part 31 and the second connecting part 42 is connected to the second rotating part 31, the second electromagnetic structure can generate a magnetic force to attract the second connecting part 42, ensuring a tight connection between the second connecting part 42 and the second rotating part 31 and preventing the second connecting part 42 from separating from the second rotating part 31 during the rotation of the second rotating part 31. In addition, when the first connecting part 41 needs to be separated from the first rotating part 21, the first electromagnetic structure can be de-energized to eliminate the magnetic force, thereby facilitating the separation of the first connecting part 41 from the first rotating part 21. When the second connecting part 42 needs to be separated from the second rotating part 31, the second electromagnetic structure can be de-energized to eliminate the magnetic force, thereby facilitating the separation of the second connecting part 42 from the second rotating part 31.

It should be noted that the first electromagnetic structure and the second electromagnetic structure may both be electromagnets.

In addition, in some embodiments, the first fixing frame 20 may be provided with a first counterweight block 22, and the first slider is disposed on the first counterweight block 22. The second fixing frame 30 may be provided with a second counterweight block 32, and the second slider is disposed on the second counterweight block 32.

In addition, in some embodiments, the data processing device 200 is further configured to: mark the mirrored feature points on the image of the normal breast; determine the surrounding area of the normal breast image based on the mirrored feature points; mirror the surrounding area to obtain a mirrored surrounding area; and generate the model data of the removed breast based on the mirrored surrounding area.

After obtaining the mirrored feature points, the mirrored feature points essentially represent the contour of the removed breast on the human torso. Since the two breasts of the human body are generally symmetrical about the midline of the torso, deviations may occur during the removal of the breast, causing the image of the residual part to not be completely symmetrical with the contour of the normal breast on the torso. Therefore, it is necessary to mark the mirrored feature points on the image of the normal breast, and the area enclosed by the mirrored feature points can represent the proportion or area of the removed breast relative to the normal breast.

In addition, the surrounding area of the normal breast image based on the mirrored feature points can be determined. This surrounding area essentially represents the contour of the removed breast on the torso after mirroring. Furthermore, this surrounding area can also delineate the area of the normal breast, and mirroring the surrounding area essentially mirrors the delineated area of the normal breast, thereby allowing the mirrored surrounding area to represent the removed breast. Since the scan image is a three-dimensional image, obtaining the mirrored surrounding area essentially provides a three-dimensional image of the removed breast, thereby enabling the generation of the model data of the removed breast. The model data is a three-dimensional image.

In addition, in the embodiments of this application, the feature points may also include the dimensional image of the removed breast.

Furthermore, when generating the model data of the removed breast based on the mirrored feature points and the image of the normal breast, the size of the normal breast can first be determined, which essentially determines the size of the removed breast and its specific position, thereby enabling the determination of the model data of the removed breast. A breast prosthesis processed based on this model data can better fit the patient's torso.

In addition, in some implementations, the human image processing method may further include: adding a marker image to the model data of the removed breast, wherein the marker image is used to position the processing tool when processing the breast model based on the model data of the removed breast.

After adding the marker image to the model data of the removed breast, when processing the breast model based on this model data, i.e., when processing the breast prosthesis, the marker image can be used to position the processing tool, thereby facilitating the processing of the breast prosthesis.

In some embodiments, the data processing device 200 is further configured to: determine the midline of the human body scan image; mirror the feature points about the midline to obtain mirrored feature points.

When determining the midline of the human body scan image, the edge lines of the two opposite sides of the torso may be determined; determine the second perpendicular line of the connecting line of the edge lines of the two opposite sides of the torso, the second perpendicular line is the midline of the human body scan image, the distance between the second perpendicular line and the edge line of one side is equal to the distance between the second perpendicular line and the edge line of the other side.

Since the human body scan image includes the image of the torso, the edge lines of the two opposite sides of the torso can be determined. The two opposite sides of the torso refer to the two sides respectively connected to the two arms of the human body. After determining the edge lines of the two opposite sides of the torso, the connecting line of these two edge lines can be determined, and the connecting line is a horizontal line, that is, the two intersection points of the connecting line with the edge lines of the two opposite sides of the torso are on the same horizontal plane. Then, the second perpendicular line perpendicular to the connecting line can be determined, and the second perpendicular line is located between the two edge lines, the distance between the second perpendicular line and the edge line of one side is equal to the distance between the second perpendicular line and the edge line of the other side, so the second perpendicular line can be used as the midline of the human body scan image. Since the two opposite sides of the human torso are symmetrical about the midline of the human torso, after determining the two edge lines of the two opposite sides of the human torso, two reference lines are actually determined, and these two reference lines are usually symmetrical about the midline of the human torso, therefore, after connecting these two reference lines, determining the perpendicular line perpendicular to the connecting line of these two reference lines, and the perpendicular line is located between these two reference lines, and the distance between the perpendicular line and these two reference lines is equal, then the perpendicular line must be the midline of the human torso.

In addition, when mirroring the feature points about the midline, it is equivalent to mirroring the contour of the normal breast on the human torso. Since the human body usually has two breasts, after one breast is removed, mirroring the contour of the normal breast on the human torso is equivalent to determining the contour of the removed breast through the contour of the normal breast. In addition, since the normal breast is the most compatible with the human body, mirroring the contour of the normal breast can also maximize the compatibility of the mirrored contour with the human torso.

In addition, when mirroring the feature points about the midline, the distance between a feature point and the midline can be determined, then the line perpendicular to the midline and passing through the feature point can be determined, and the line intersects with the midline, the intersection point of the line and the midline can be determined, and the target point on the line perpendicular to the midline with the distance from the intersection point equal to the target distance can be determined, the target distance is equal to the distance between the feature point and the midline, and the target point is used as the mirrored feature point of the feature point.

For example, for feature point 1, the distance between feature point 1 and the midline can be determined first, the distance is L, then the line perpendicular to the midline and passing through feature point 1 can be determined, the line is line M, and line M intersects with the midline, the intersection point is B, then the target point on line M with the distance from intersection point B equal to L can be determined, the target point is the mirrored feature point of feature point 1.

In the embodiments of this application, since the scanner 100 is electrically connected to the data processing device 200, after the scanner 100 scans the human body to obtain the human body scan image, the scanner 100 can transmit the human body scan image to the data processing device 200. Since the data processing device 200, in response to the first input, marks feature points on the image of the residual part after the breast has been removed, mirrors the feature points to obtain the mirrored feature points, and generates the model data of the removed breast based on the mirrored feature points and the image of the normal breast, after the scan image is transmitted to the data processing device 200, the data processing device 200 can generate the model data of the removed breast. Since the data processing device 200 is electrically connected to the breast prosthesis processing device 300 and the painting device 400, the data processing device 200 can transmit the model data of the removed breast to the breast prosthesis processing device 300 and the painting device 400. The breast prosthesis processing device 300 includes a processor, a first driving component 70, and a container 40, the processor is electrically connected to the data processing device 200, the processor is electrically connected to the first driving component 70, so the processor can receive the model data transmitted by the data processing device 200, and based on the model data, control the first driving component 70 to drive the container 40 to rotate, after the container 40 rotates, the silicone in the container 40 will rotate with the container 40, thereby forming a breast prosthesis model, which can then be moved to the painting device 400. The painting device 400 includes a controller 001, a spray head 004, and a fixing base, the fixing base is configured to fix the breast prosthesis model, the controller 001 is electrically connected to the data processing device, so after the controller 001 receives the model data transmitted by the data processing device 200, the controller 001 can control the spray head 004 to spray paint on the breast prosthesis model based on the model data, thereby forming the breast prosthesis.

That is, in the embodiments of this application, by setting up the scanner 100, the data processing device 200, the breast prosthesis processing device 300, and the painting device 400, and electrically connecting the scanner 100 to the data processing device 200, and electrically connecting the data processing device 200 to the breast prosthesis processing device 300 and the painting device 400, after the scanner 100 scans the human body to obtain the human body scan image, the data processing device 200 can generate the model data of the removed breast based on the human body scan image, and transmit the model data to the breast prosthesis processing device 300 and the painting device 400, the breast prosthesis processing device 300 can process the breast prosthesis model based on the model data, and after the breast prosthesis model is placed on the painting device 400, the painting device 400 can spray paint on the breast prosthesis model to form the breast prosthesis, thereby facilitating the formation of the breast prosthesis.

In the description of the above embodiments, specific features, structures, materials, or characteristics may be combined in any one or more embodiments or examples in a suitable manner.

The above descriptions are only specific implementations of this application, but the scope of protection of this application is not limited to this. Any person skilled in the art can easily think of changes or replacements within the technical scope disclosed in this application, and they should all be covered within the scope of protection of this application. Therefore, the scope of protection of this application should be determined by the scope of protection of the claims.

In the description provided herein, a large number of specific details are described. However, it can be understood that the embodiments of this application can be practiced without these specific details. In some instances, well-known methods, structures, and technologies are not shown in detail so as not to obscure the understanding of this description.

Finally, it should be noted that the above embodiments are only used to illustrate the technical solutions of this application, and are not intended to limit it. Although this application has been described in detail with reference to the foregoing embodiments, those of ordinary skill in the art should understand that they can still modify the technical solutions described in the foregoing embodiments, or equivalently replace some of the technical features. These modifications or replacements do not cause the essence of the corresponding technical solutions to deviate from the spirit and scope of the technical solutions of the embodiments of this application.

The invention claimed is:

1. A breast prosthesis processing system, comprising: a scanner, a data processing device, a breast prosthesis processing device, and a printing device;
   the scanner is electrically connected to the data processing device, and the data processing device is electrically connected to the breast prosthesis processing device and the printing device;
   the scanner is configured to scan a human body to obtain a body scan image and transmit the body scan image to the data processing device, wherein the body scan image includes a scan image of a torso, and the scan image of the torso comprises an image of a normal breast and an image of a residual part after mastectomy;
   the data processing device is configured to, in response to a first input, mark feature points on the image of the residual part after mastectomy; mirror the feature points to obtain mirrored feature points; generate model data of an excised breast based on the mirrored feature points and the image of the normal breast, and transmit the model data of the excised breast to the breast prosthesis processing device and the printing device;

the breast prosthesis processing device comprises a processor, a first actuator, and a container, wherein the processor is electrically connected to the data processing device and the first actuator, and the processor is configured to control the first actuator based on the model data to drive the container to rotate, thereby forming a breast prosthesis model from silicone within the container;

the printing device comprises a controller, a nozzle, and a fixing base, wherein the fixing base is configured to secure the breast prosthesis model, the controller is electrically connected to the data processing device and the nozzle, and the controller is configured to control the nozzle to spray pigment onto the breast prosthesis model based on the model data;

wherein the printing device further comprises a robotic arm, a distance measurement module, and an optical sensor module, wherein the robotic arm, the distance measurement module, the optical sensor module, and the nozzle are electrically connected to the controller, and the nozzle, the distance measurement module, and the optical sensor module are mounted on the robotic arm, with the nozzle, the distance measurement module, and the optical sensor module positioned on the robotic arm; and the distance measurement module is configured to detect a distance between the nozzle and the breast prosthesis model; and the controller is configured to control a movement of the robotic arm to drive the optical sensor module, enabling the optical sensor module to determine a working surface for the nozzle, wherein the working surface is a curved surface at a predetermined distance from a surface of the breast prosthesis model and conforming to a surface shape of the breast prosthesis model; based on the working surface, control the movement of the robotic arm to drive the nozzle and the distance measurement module, and determine a target distance between the nozzle and the breast prosthesis model based on the distance measurement module; and control the nozzle to spray pigment onto the breast prosthesis model based on the model data, the working surface, and the target distance.

2. The breast prosthesis processing system according to claim 1, wherein the robotic arm is provided with a drive motor connected to the nozzle, and the drive motor is electrically connected to the controller;

the controller is further configured to: when the distance between the working surface and the surface of the breast prosthesis model equals the target distance, control the nozzle to move along the working surface and spray pigment onto the breast prosthesis model; when the distance between the working surface and the surface of the breast prosthesis model does not equal the target distance, control the drive motor to move, thereby driving the nozzle to adjust the distance between the nozzle and the breast prosthesis model until the distance equals the distance between the working surface and the surface of the breast prosthesis model, and control the nozzle to spray pigment onto the breast prosthesis model.

3. The breast prosthesis processing system according to claim 1, wherein the breast prosthesis model comprises multiple target regions, and the multiple target regions are adjacent to each other;

the controller is further configured to: obtain model data for each of the multiple target regions; and control the nozzle to spray pigment onto each target region based on the model data of each target region, the working surface, and the target distance.

4. The breast prosthesis processing system according to claim 1, wherein the controller is further configured to: store the target distance;

when the number of target distances equals a preset threshold, control the nozzle to spray pigment onto the breast prosthesis model based on the target distance corresponding to each model data.

5. The breast prosthesis processing system according to claim 1, wherein the breast prosthesis processing device further comprises a base, a first bracket, a second bracket, a container, a first connector, and a second connector;

the first bracket and the second bracket are slidably connected to the base, and the sliding direction of the first bracket differs from that of the second bracket;

the first bracket is provided with a first rotating part, the second bracket is provided with a second rotating part, the container has a first connecting part and a second connecting part, the first connecting part is connectable to the first rotating part, and the second connecting part is connectable to the second rotating part, the container is configured to hold a containment shell, the containment shell is configured to contain a viscous fluid medium, the first rotating part is capable of driving the first connecting part to rotate about an axis of the first rotating part, thereby causing the container to rotate about the axis of the first rotating part, the second rotating part is capable of driving the second connecting part to rotate about an axis of the second rotating part, thereby causing the container to rotate about the axis of the second rotating part;

the first actuator is disposed on the base, the first connector and the second connector are fixedly connected to the rotational output shaft of the first actuator, the first connector is connected to the first bracket, the second connector is connected to the second bracket, the first actuator drives the first connector and the second connector to rotate, thereby causing the first bracket and the second bracket to slide relative to the base, the first connecting part is separated from the first rotating part, the second connecting part is connected to the second rotating part, or the first connecting part is connected to the first rotating part, and the second connecting part is separated from the second rotating part.

6. The breast prosthesis processing system according to claim 5, wherein the breast prosthesis processing device further comprises a second actuator and a third actuator;

the second actuator is disposed on the first bracket, the third actuator is disposed on the second bracket, the second actuator is connected to the first rotating part and is configured to drive the first rotating part to rotate about the axis of the first rotating part, and the third actuator is connected to the second rotating part and is configured to drive the second rotating part to rotate about the axis of the second rotating part.

7. The breast prosthesis processing system according to claim 5, wherein the first bracket is connected to a first connecting rod provided with a first sliding pin, the first connector is provided with a first sliding groove, and the first sliding pin is embedded in the first sliding groove;

the second bracket is connected to a second connecting rod provided with a second sliding pin, the second connector is provided with a second sliding groove, and the second sliding pin is embedded in the second sliding groove.

8. The breast prosthesis processing system according to claim 1, wherein the data processing device is further configured to: mark the mirrored feature points on the image of the normal breast; determine a surrounding region of the image of the normal breast encircled by the mirrored feature points; mirror the surrounding region to obtain a mirrored surrounding region; and generate the model data of the excised breast based on the mirrored surrounding region.

9. The breast prosthesis processing system according to claim 1, wherein the data processing device is further configured to: determine a midline of the body scan image; and mirror the feature points about the midline to obtain the mirrored feature points.

* * * * *